United States Patent [19]

Kotani et al.

[11] Patent Number: 4,618,869

[45] Date of Patent: Oct. 21, 1986

[54] FACSIMILE PRINT OUT SYSTEM EMPLOYING AN INK JET SYSTEM PRINTER

[75] Inventors: Matahira Kotani, Ikoma; Masafumi Matsumoto, Takaichi, both of Japan

[73] Assignee: Sharp Kabushiki Kaisha, Osaka, Japan

[21] Appl. No.: 316,401

[22] Filed: Oct. 29, 1981

Related U.S. Application Data

[63] Continuation of Ser. No. 29,920, Apr. 13, 1979, abandoned.

[30] Foreign Application Priority Data

Apr. 17, 1978 [JP] Japan ............................ 53-45740

[51] Int. Cl.⁴ ............................................ G01D 15/18
[52] U.S. Cl. ............................ 346/75; 346/140 R
[58] Field of Search ........................... 346/75, 140

[56] References Cited

U.S. PATENT DOCUMENTS 3,298,030 1/1967 Lewis ............................................ 346/75
3,555,558 1/1971 Sherman ...................................... 346/75
3,805,274 4/1974 Kashio ........................................ 346/75
3,878,517 4/1975 Kasubuchi .................................. 346/75

OTHER PUBLICATIONS

Videojet M 9600 Technical Description; A.B. Dick Co., Chicago, Ill., pp. 2-1, 2-5, Jan. 1971.

*Primary Examiner*—Joseph W. Hartary
*Attorney, Agent, or Firm*—Birch, Stewart, Kolasch & Birch

[57] ABSTRACT

A facsimile print out system includes an ink jet system printer of the charge amplitude controlling type having a reciprocating printer head. A crystal oscillation circuit is provided for developing a base frequency signal. A first frequency divider receives the base frequency signal for developing a first timing signal which determines droplet formation timing in the ink jet system printer. A second frequency divider receives the first timing signal for developing a second timing signal which controls the reciprocating movement of the printer head, whereby the reciprocating movement of the printer head is correlated with the droplet formation in order to obtain an accurate printout.

11 Claims, 7 Drawing Figures

FACSIMILE PRINT OUT SYSTEM EMPLOYING AN INK JET SYSTEM PRINTER

This application is a continuation of copending application Ser. No. 029,920, filed on Apr. 13, 1979, now abandoned.

BACKGROUND OF THE INVENTION

The present invention relates to a facsimile print out system and, more particularly, to a facsimile print out system employing an ink jet system printer of the charge amplitude controlling type.

Generally, an ink jet system printer of the charge amplitude controlling type includes a reciprocating printer head on which an ink droplet issuance unit and a charging tunnel is mounted. The ink droplet issuance unit comprises a nozzle for emitting an ink liquid and an electro-mechanical transducer for vibrating the nozzle at a given frequency. That is, ink droplets are continuously emitted from the ink droplet issuance unit at the given frequency. A print information signal is applied to the charging tunnel to selectively charge the ink droplets emitted from the ink droplet issuance unit. To achieve an accurate print operation, application of the print information signal must be timed in agreement with formation of the ink droplets. A pair of deflection electrodes are disposed between the recording paper and the printer head to establish a constant high-voltage field in the column direction. The charged ink droplets are deflected in the column direction in accordance with the charge amplitude carried thereon while they pass through the constant high-voltage field formed by the pair of deflection electrodes and deposited on the paper. Ink droplets not charged by the charging tunnel are not deflected and directed to a beam gutter for recirculation purposes.

Deflection in the row direction is achieved by the reciprocating movement of the printer head. When one row printing is completed, the recording paper is shifted in the column direction by one row width.

When the above-mentioned ink jet system printer of the charge amplitude controlling type is employed as a print out device of a facsimile system, it is of great importance that a system synchronization signal is correlated with the droplet formation in the ink jet system printer to ensure an accurate print out operation. If the system synchronization signal is developed without regard to the droplet formation rhythm, the droplet alignment on the paper in the column direction will be deteriorated.

OBJECTS AND SUMMARY OF THE INVENTION

Accordingly, an object of the present invention is to provide an improved facsimile print out system employing an ink jet system printer.

Another object of the present invention is to provide a control system for ensuring an accurate print out operation in a facsimile system employing an ink jet system printer of the charge amplitude controlling type.

Still another object of the present invention is to provide a control system for correlating a facsimile synchronization signal with a droplet formation rhythm of an ink jet system printer included in a facsimile print out system.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a crystal oscillator is provided for developing a base frequency signal. The base frequency signal of which is applied to a first frequency divider, an output signal is applied to an electro-mechanical transducer attached to a nozzle of the ink jet system printer in order to determine the droplet formation rhythm. The output signal of the first frequency divider is also applied to second and third frequency dividers. An output signal of the second frequency divider is applied to a charging signal generator to determine the timing of application of a charging signal.

An output signal of the third frequency divider is used as a system synchronization signal for controlling the initiation of row printing.

With such an arrangement, the facsimile print out system is totally synchronized and, therefore, an accurate print out operation is performed. More specifically, the ink droplets deposited on the receiving paper are accurately aligned in both of the column and row directions.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
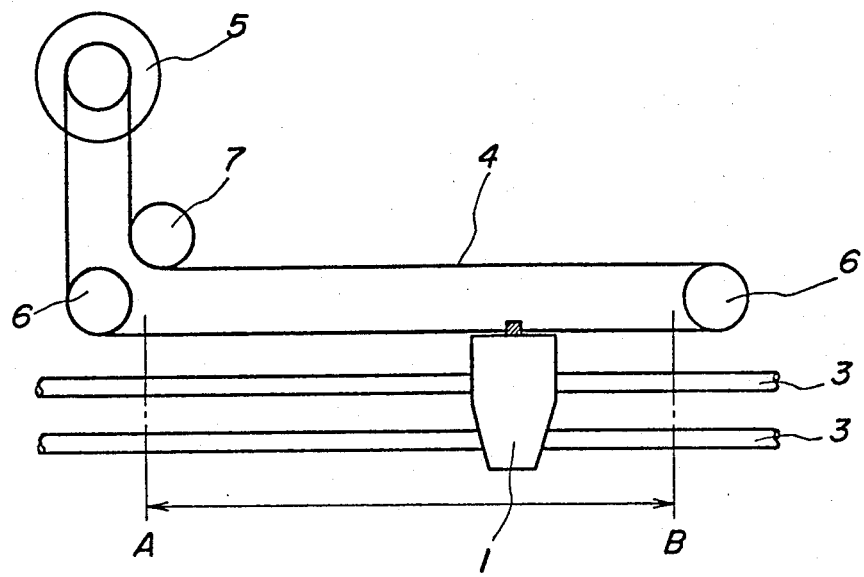
FIG. 1 is a schematic plan view of a printer head drive mechanism included in an ink jet system printer employed in a facsimile print out system of the present invention.
Figure 2:
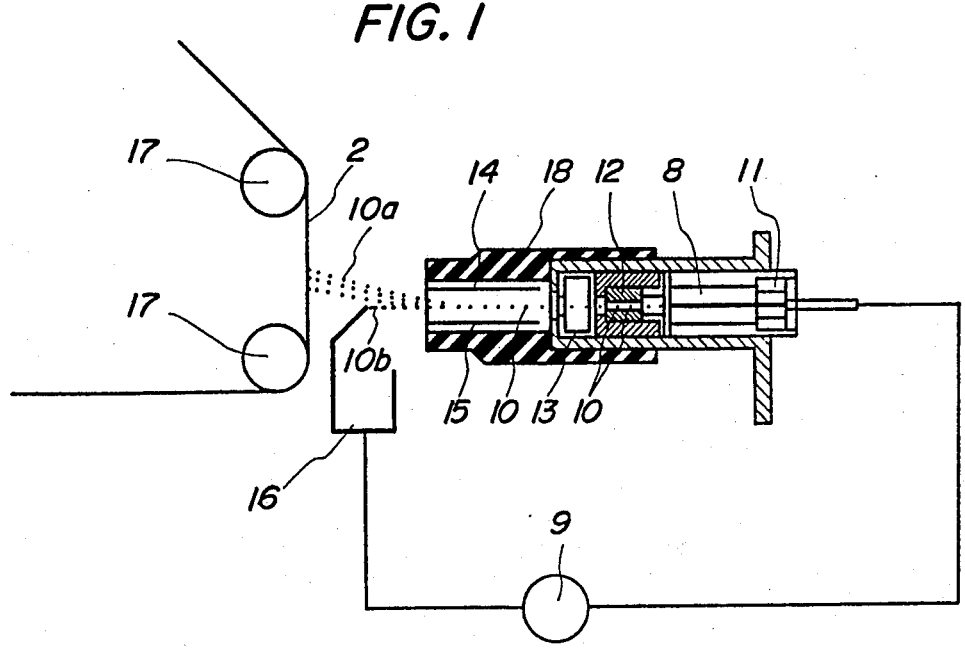
FIG. 2 is a combined sectional view of the printer head and schematic view of the ink jet system printer employed in the facsimile print out system of the present invention.
Figure 3:
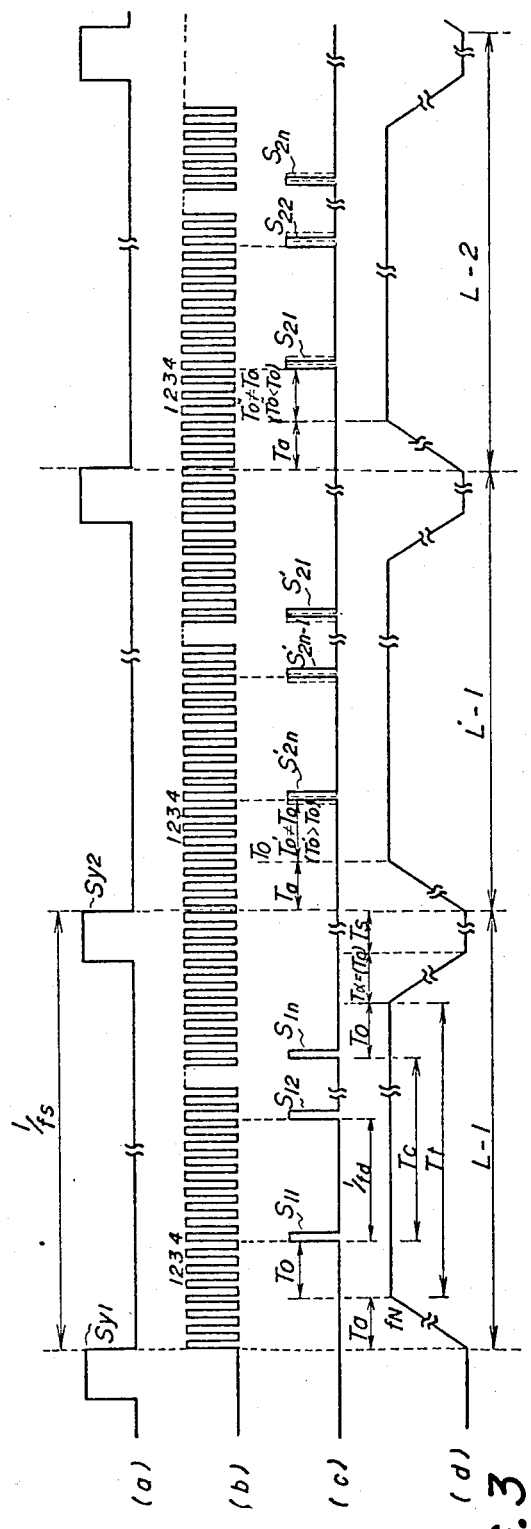
FIGS. 3(a) through 3(d) are time charts showing various signals occurring within a conventional facsimile print out system.

Referring now in detail to the drawings, and to facilitate a more complete understanding of the present invention, an ink jet system printer of the charge amplitude controlling type employed in an embodiment of a facsimile print out system of the present invention will be first described with reference to FIGS. 1 and 2.

The ink jet system printer of the charge amplitude controlling type mainly comprises a reciprocating printer head 1 and a record receiving paper 2. The printer head 1 is slidably mounted on a pair of shafts 3 and fixed to a drive wire 4. The drive wire 4 is extended between pulleys 6 and 7 and a pulse motor 5, whereby the printer head 1 is driven to reciprocate along the shafts 3 in the lateral direction, namely, in the row direction, within a scan width $\overline{AB}$.

The printer head 1 mainly comprises a nozzle 8, an electro-mechanical transducer 11, a charging tunnel 12, and a pair of deflection electrodes 14 and 15.

An ink liquid is supplied from an ink liquid supply system 9 to the nozzle 8 under a predetermined pressure. The electro-mechanical transducer 11 is attached to the nozzle 8 to vibrate the nozzle 8 at a given frequency, whereby ink droplets 10 are emitted from the nozzle 8 at the given frequency. A charging signal representative of print information is applied to the charging tunnel 12 to charge the ink droplets 10 in accordance with the print information. Charged ink droplets 10a are deflected while they pass through a high-voltage field established by the pair of deflection electrodes 14 and 15 in accordance with the charge amplitude carried thereon. The thus deflected ink droplets 10a are deposited on the record receiving paper 2 to perform the print out operation. The deflection of the charged ink droplets 10a is conducted in the vertical direction, namely, in the column direction.

Ink droplets 10b are not charged with the charging signal are not deflected, and are directed to a beam gutter 16 for recirculation puroses. When one row printing is completed the record receiving paper 2 is shifted by one row width in the vertical, or column direction through the use of rollers 17.

A phase sensor 13 is disposed between the charging tunnel 12 and the deflection electrodes 14 and 15 for detecting the charge amplitude carried on the ink droplets 10a through the use of the electrically induced signals. An output signal of the phase sensor 13 is applied to a phase synchronization circuit to properly control the relation between the droplet formation and the charging signal application. The above-mentioned nozzle 8, the electro-mechanical transducer 11, the charging tunnel 12, the phase sensor 13, and the deflection electrodes 14 and 15 are held by an insulating holder 18.

An operational mode of the above-mentioned ink jet system printer in the facsimile print out system will be described hereinbelow, wherein a solid black picture signal is applied to the facsimile print out system. The picture signal is temporarily stored in a line buffer memory, and the thus stored signal is sequentially read out in response to a system synchronization signal. More specifically, a row of printing is initiated upon generation of the system synchronization signal.

To achieve high speed scanning, the pulse motor 5 is gradually accelerated, and is gradually decelerated.

Figure 4:
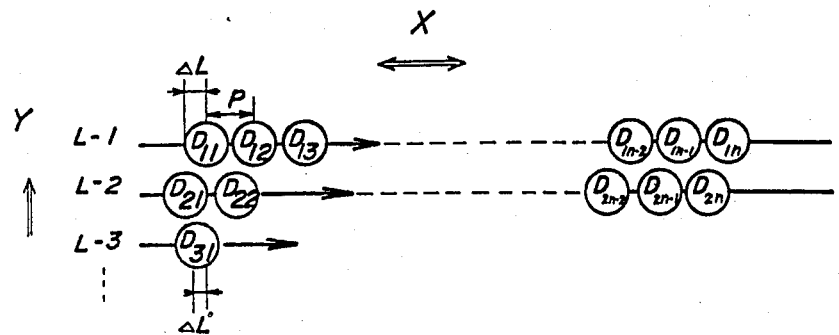
FIG. 4 is a chart for explaining a printout formed by the conventional facsimile print out system of FIGS. 3(a) through 3(d)

FIGS. 3(a) through 3(d) show the operational mode of the conventional system, and FIG. 4 shows the printout in the system of prior art.

When a row printing initiation signal $S_{y1}$ is developed (FIG. 3(a)), an acceleration command is developed. In response to the signal, pulse motor 5 is gradually accelerated during an acceleration period Ta (FIG. 3(d)), wherein a drive pulse frequency $f_1, f_2, \ldots f_N$ is gradually increased step by step. When the drive pulse frequency reaches $f_N$, the pulse motor 5 reaches a constant speed rotation and, hence, the printer head 1 travels forward at a fixed speed. When a preselected number of drive pulses are counted under the fixed speed drive, or when a preselected time period $T_t$ has passed, a deceleration command is developed. The drive pulse frequency is gradually reduced ($f_N, \ldots f_2, f_1$) to decelerate the rotation of the pulse motor 5. Then, the printer head 1 is held stationary for a period of time Ts, thereby completing the forward drive.

Upon generation of the next synchronization signal $S_{y2}$, the printer head 1 is driven to travel backward in a same manner as the forward drive. During the backward travel, no actual print operation is conducted but the ink droplets 10 are continuously emitted. The above-mentioned operation is repeated one row by one row.

FIG. 3(b) shows a clock pulse signal applied to the electro-mechanical transducer 11 for producing the droplets. In the conventional system, this clock pulse signal is not synchronized with the system synchronization signal $S_y$, as indicated by the lack of alignment of the pulses of signals $S_y$ with the pulses of the clock pulse signal (FIGS. 3(a) and 3(c)).

The actual print out operation is conducted after a lapse of a predetermined period of time To after the printer head 1 achieves the constant speed forward travel. More specifically, the clock pulse signal, which is applied to the electro-mechanical transducer 11, is gated when the printer head 1 reaches the constant speed, and the first print information is applied to the charging tunnel 12 when the fourth clock pulse is developed. FIG. 3(c) shows the charging signal to be applied to the charging tunnel 12.

In this example, every eighth ink droplet 10 is subject to the actual printing. The remaining seven ink droplets 10 within one cycle of eight droplets are never charged without regard to the print information, and are directed to the beam gutter 16. In the conventional system, there is a great possibility that the system synchronization signal $S_y$ is phase shifted with respect to the clock pulse signal. As shown in the second row forward drive phase (L-2) of FIG. 3, the period of time $T_o'$ in the second row forward drive may become smaller than the desired predetermined period of time $T_o$. This will preclude an accurate print out operation.

FIG. 4 shows an example of the actual printout formed by the conventional system as discussed with reference to FIGS. 3(a) through 3(d). The printer head 1 is driven to travel in the row direction, namely, along the X axis, and the droplet deflection and the paper shift drive is conducted in the column direction, namely, along the Y axis.

As shown in FIG. 4, there is a possibility, in the conventional system, that a displacement $\Delta L$ occurs between the first dot $D_{11}$ of he first row (L-1) and the first dot $D_{21}$ or $D_{31}$ of the second row (L-2) or the third row (L-3). This will preclude an accurate print-out operation. The above-mentioned displacement is caused by the lack of synchronization of the system synchronization signal $S_y$ with respect to the clock pulse signal.

Figure 5:
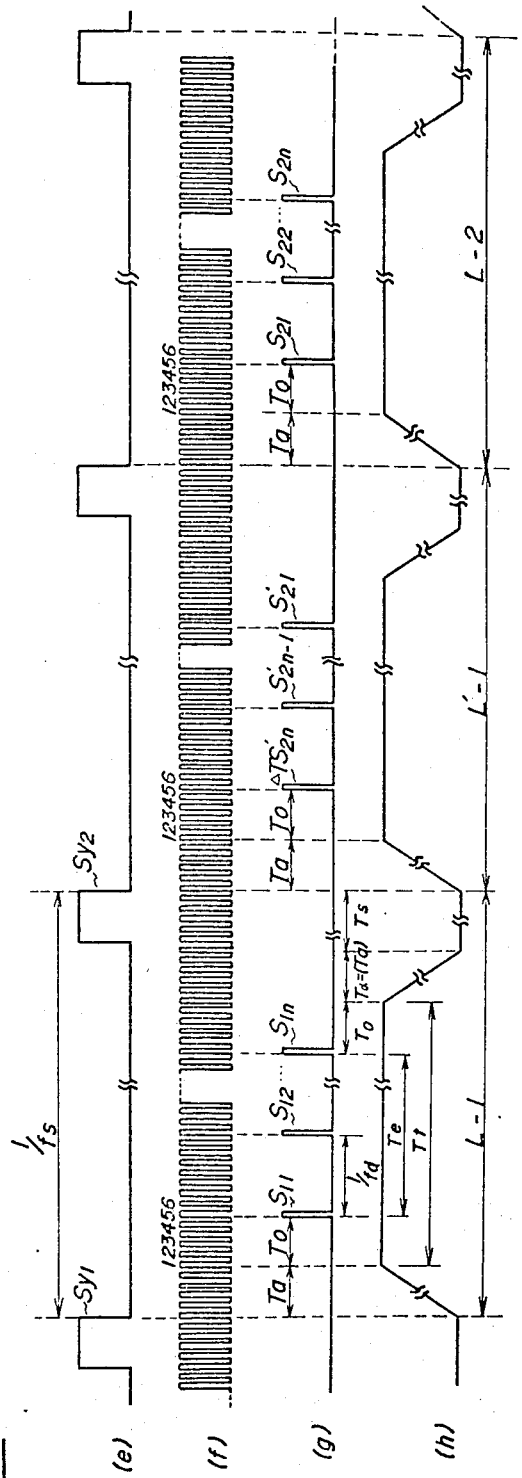
FIGS. 5(e) through 5(h) are time charts showing various signals occurring within an embodiment of a facsimile print out system of the present invention.
Figure 6:
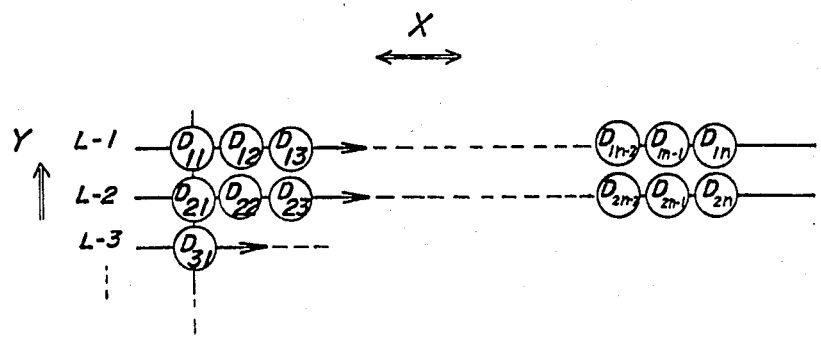
FIG. 6 is a chart showing an example of a print out formed by an embodiment of the facsimile print out system of FIGS. 5(e) through 5(h)

The present invention eliminates the above-mentioned displacement, and provides a printout as shown in FIG. 6. An embodiment of the control system of the present invention will be described with reference to FIGS. 5 through 7.

A system synchronization signal $S_y$ (FIG. 5(e)) has a frequency fs. The printer head 1 is drive to travel in synchronization with the system synchronization signal $S_y$ in a similar way as discussed with reference to FIG. 3. More specifically, the printer head 1 is accelerated during the acceleration period $T_a$, travels at a constant speed during a period of time $T_t$, is decelerated during the deceleration period $T\alpha(=Ta)$, and is held stationary during the period of time $T_s$ as shown in FIG. 5(h).

Figure 7:
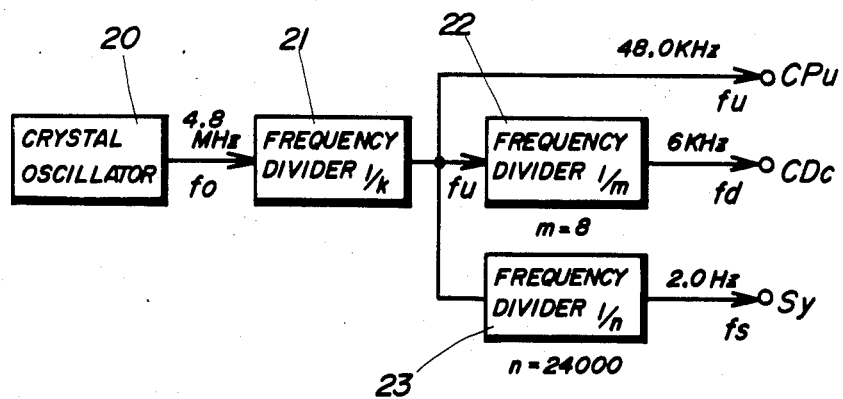
FIG. 7 is a block diagram of an essential part of a control system of an embodiment of the facsimile print out system of the present invention.

The system synchronization signal $S_y$, the clock pulse signal $CP_u$ (FIG. 5(f)) to be applied to the electro-mechanical transducer 11, and the charging signal $CD_c$ (FIG. 5(g)) to be applied to the charging tunnel 12 are timed by a control signal generator shown in FIG. 7.

The control signal generator comprises a crystal oscillation circuit 20, and three frequency dividers 21, 22 and 23. The crystal oscillation circuit 20 develops a base frequency signal $f_o$ (for example, 4.8 MHz), which is applied to the first frequency divider 21. The first frequency divider 21 develops a first control signal $f_u$ (for example, 48 KHz), which is utilized to provide the clock pulse signal $CP_u$ (FIG. 5(f)) to be applied to the electro-mechanical transducer 11. That is, the ink droplets 10 are formed at the frequency determined by the first control signal $f_u$.

The thus obtained first control signal $f_u$ is applied to the second and third frequency dividers 22 and 23. The second frequency divider 22 divides $f_u$ by a factor of, for example, 8 (FIG. 7) and develops a second control signal $f_d$ (for example, 6 KHz), which is utilized to provide the charging signal $CD_c$ (FIG. 5(g)) to be applied to the charging tunnel 12. That is, every eighth droplet 10 is used for the actual print out operation. In the example of FIG. 5, the first actual printed droplet is the sixth droplet from the initiation of the constant speed travel of the printer head 1. As shown in FIG. 5(g), the charging signals $S_{11}$, $S_{12}$, $S_{13}$, . . . are developed every eight clock pulse $CP_u$ when a solid black picture is desired to be printed out.

The third frequency divider 23 divides $f_u$ by, for example, a factor of 24,000 (FIG. 7) and develops a third control signal $f_s$ (for example, 2 Hz), which is utilized to provide the system synchronization signal $S_y$ (FIG. 5(e)).

More specifically, the frequencies of the base sigal ($f_o$), the clock pulse signal $CP_u(fu)$, the charging signal $CD_c(f_d)$, and the system synchronization signal $S_y(f_s)$ satisfy the following relationships.

$$f_u = f_o/k$$

$$f_d = f_o/km$$

$$f_s = f_o/kn$$

wherein: k, m and n are integers. Integer n is an integer multiple of m, as indicated by the values shown in FIG. 7 and discussed above.

With such an arrangment, the time interval $T_o$ is fixed for every row of printing. Therefore, the first dots in every row are accurately aligned as shown in FIG. 6.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A facsimile print out system comprising an ink jet system printer for printing a plurality of lines, each line comprising a series of dots formed by deposit of ink droplets on a recording medium, and a control circuit for controlling the print out operation conducted by said ink jet printer, said control circuit comprising;
   first means for developing a first timing signal for controlling droplet formation timing in said ink jet system printer;
   second means for developing a second timing signal for controlling initiation of printing of each line formed by said printer, said second timing signal being synchronized with said first timing signal whereby formation of droplets is synchronized with initiation of printing of each line and each line is in alignment with every other line;
   wherein said first means comprises means for outputting a first signal at a first frequency for controlling droplet formation; and
   said second means comprises means for dividing said first frequency to obtain a second frequency and for outputting a second signal at said second frequency for controlling initiation of printing of each line.

2. A system as in claim 1, wherein said second means comprises means for dividing said first frequency by an integer.

3. A facsimile print out system for printing a plurality of lines, each line comprising a series of dots formed by deposit of ink droplets on a recording medium, said system comprising:
   an ink jet printing head having means for emitting ink droplets;
   means for selectively deflecting said ink droplets;
   means for traversing said printing head relative to the recording medium;
   first means for providing a first timing signal for controlling droplet formation by said printer head;
   second means for providing a second timing signal for controlling said deflecting means;
   third means for providing a third timing signal for controlling initiation of printing of each line;
   wherein said first, second and third means synchronizes said first, second and third timing signals whereby emission of droplets, deflection of droplets and initiation of printing of each line will be synchronized with each other and each line will be in alignment with every other line; and
   wherein said first timing signal has a first frequency, said second timing signal has a second frequency and said third timing signal has a third frequency, and said synchronizing means comprises means for dividing said first frequency to obtain said second and third frequencies.

4. A system as in claim 3, wherein said dividing means comprises a first divider for dividing said first frequency to obtain said second frequency, and a second divider for dividing said first frequency to obtain said third frequency.

5. A system as in claim 4, wherein said first and second dividers divide said first frequency by first and second integers, respectively.

6. A system as in claim 5 wherein said second integer is an integer multiple of said first integer.

7. A facsimile print out system comprising an ink jet printer of the charge amplitude controlling type for printing a plurality of lines on a print receiving medium, each line including a plurality of printing dots, the ink jet printer including a transducer for producing a series of droplets to form the dots and a charging tunnel for deflecting said droplets mounted on a printer head which is traversable with respect to said medium for forming said lines, the facsimile print out system further including a control circuit for controlling the operation of said ink jet printer and for vertically aligning the first dots of each of the respective lines on said print receiving medium, said control circuit comprising:

means for developing a clock signal;

first frequency dividing means responsive to said clock signal for dividing the frequency of said clock signal by a first predetermined factor and developing a first timing signal, said first timing signal energizing said transducer;

second frequency dividing means responsive to said first timing signal for dividing the frequency of said first timing signal by a second predetermined factor for developing a second timing signal thereby synchronizing said second timing signal with said first timing signal, said second timing signal energizing said charging tunnel; and third frequency dividing means responsive to said first timing signal for dividing the frequency of said first timing signal by a third predetermined factor for developing a third timing signal for initiating driving of said printer head thereby synchronizing said third timing signal with said first timing signal thereby ensuring alignment of the first printed dots of each of the respective lines on said print receiving medium.

8. The facsimile printout system of claim 7, wherein said printer head comprises:

nozzle means for emitting an ink liquid therefrom, said transducer vibrating said nozzle means at a given frequency in accordance with said first timing signal thereby forming ink droplets at a frequency substantially equal to said given frequency; and said charging tunnel charges said ink droplets in accordance with said second timing signal.

9. A system as in claim 7, wherein said second factor is a first integer and said third factor is a second integer, and wherein said second integer is an integer multiple of said first integer.

10. A synchronization control circuit for controlling the printing operation of an ink jet printer, said ink jet printer printing a plurality of lines on a print receiving medium, each line having a plurality of printed dots, said ink jet system printer including a nozzle means for emitting ink droplets therefrom for deposit on said print receiving medium, first means for vibrating said nozzle at a given frequency, a second means for charging said ink droplets in accordance with print information, and driving means for traversing said nozzle means with respect to said medium, said control circuit including means for constraining the ink jet system printer to vertically align the first printed dots of the respective lines on said print receiving medium, said synchronization control circuit comprising:

means for developing a clock signal;

first frequency dividing means responsive to said clock signal for dividing the frequency of said clock signal by a first predetermined factor and developing a first timing signal, said first timing signal energizing said first means;

second frequency dividing means responsive to said first timing signal for dividing the frequency of said first timing signal by a second predetermined factor for developing a second timing signal thereby synchronizing said second timing signal with said first timing signal, said second timing signal energizing said second means; and third frequency dividing means responsive to said first timing signal for dividing the frequency of said first timing signal by a third predetermined factor for developing a third timing signal for initiating operation of said driving means thereby synchronizing said third timing signal with said first timing signal thereby ensuring alignment of the first printed dots of the respective lines on said print receiving medium.

11. A control circuit as in claim 10, wherein said second factor is a first integer and said third factor is a second integer, and wherein said second integer is an integer multiple of said first integer.

* * * * *